INVENTOR.
EDWARD M. STUBBLEFIELD
PER EDBERG
BY
Holmes & Andersen
ATTORNEYS

United States Patent Office 3,120,113
Patented Feb. 4, 1964

3,120,113
ABSORPTION REFRIGERATION SYSTEM
Edward M. Stubblefield and Per Edberg, La Crosse, Wis.,
assignors to The Trane Company, La Crosse, Wis., a
corporation of Wisconsin
Filed Dec. 12, 1960, Ser. No. 75,256
9 Claims. (Cl. 62—475)

This invention relates to refrigeration and is more particularly concerned with the removal of noncondensable gases from an absorption refrigeration system operating at low pressures.

It is an object of the invention to provide an improvement in refrigeration systems for collecting and removing noncondensable gases from one part of the system such as the absorber, for example.

It is another object of this invention to provide an improved auxiliary absorber for establishing positive flow of noncondensable gases from all areas of the main absorber and to provide for the flow of absorption liquid from the main absorber through the auxiliary absorber. The auxiliary absorber is relatively small compared to the main absorber from which the noncondensable gases are withdrawn in order that such gases may be concentrated in a small space.

The space in the auxiliary absorber isolated from the main flow of refrigerant vapor from the evaporator. Therefore the solution in the auxiliary absorber is more concentrated and at a lower temperature than that in the main absorber. Consequently a slightly lower pressure is maintained in the auxiliary absorber sufficient to cause a mixture of noncondensable gases and refrigerant vapor to flow from the main absorber to the auxiliary absorber. By bringing this mixture of gases and refrigerant vapor into intimate contact with the colder and more concentrated absorption solution in the auxiliary absorber, most of the refrigerant vapor accompanying the gases withdrawn from the main absorber is absorbed into solution whereby the noncondensable gases are separated from the refrigerant vapor.

The absorption liquid after being utilized to absorb refrigerant vapor in the auxiliary absorber merely flows back to the main absorber. The vacuum pump removes the noncondensable gases from the auxiliary absorber.

It is another object of this invention to construct the auxiliary absorber within the space of the main absorber in order to eliminate the necessity for a completely leakproof chamber and in order to eliminate the need for absorption liquid conduits between the main absorber and the auxiliary absorber.

It is another object of the invention to locate the auxiliary absorber in the path of the absorption solution sprays of the main absorber.

It is still another object of the invention to construct the auxiliary absorber around portions of certain tubes of the main absorber, thereby simplifying the construction.

Other objects and advantages of the invention will become apparent as the specification proceeds to describe the invention with reference to the accompanying drawings in which:

FIGURE 4 is a partial view of the tube for collecting noncondensable gases.

FIGURE 5 is a cross-sectional view of the gas collecting tube taken on line 5—5 of FIGURE 4.

Figure 1:
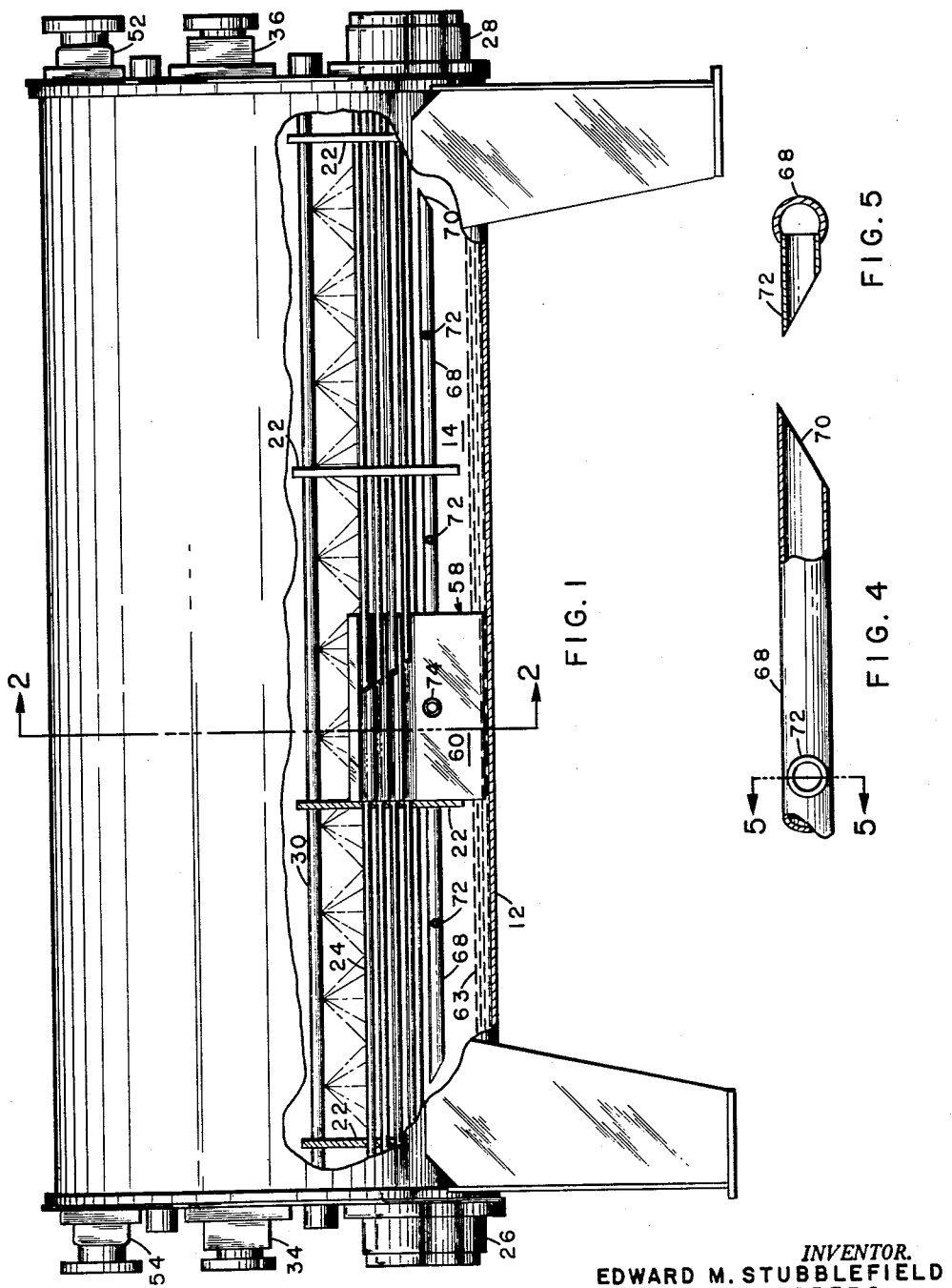
FIGURE 1 is an elevational view of the machine with portions of the shell broken away to more clearly show the auxiliary absorber and the main absorber.
Figures 2, 3:
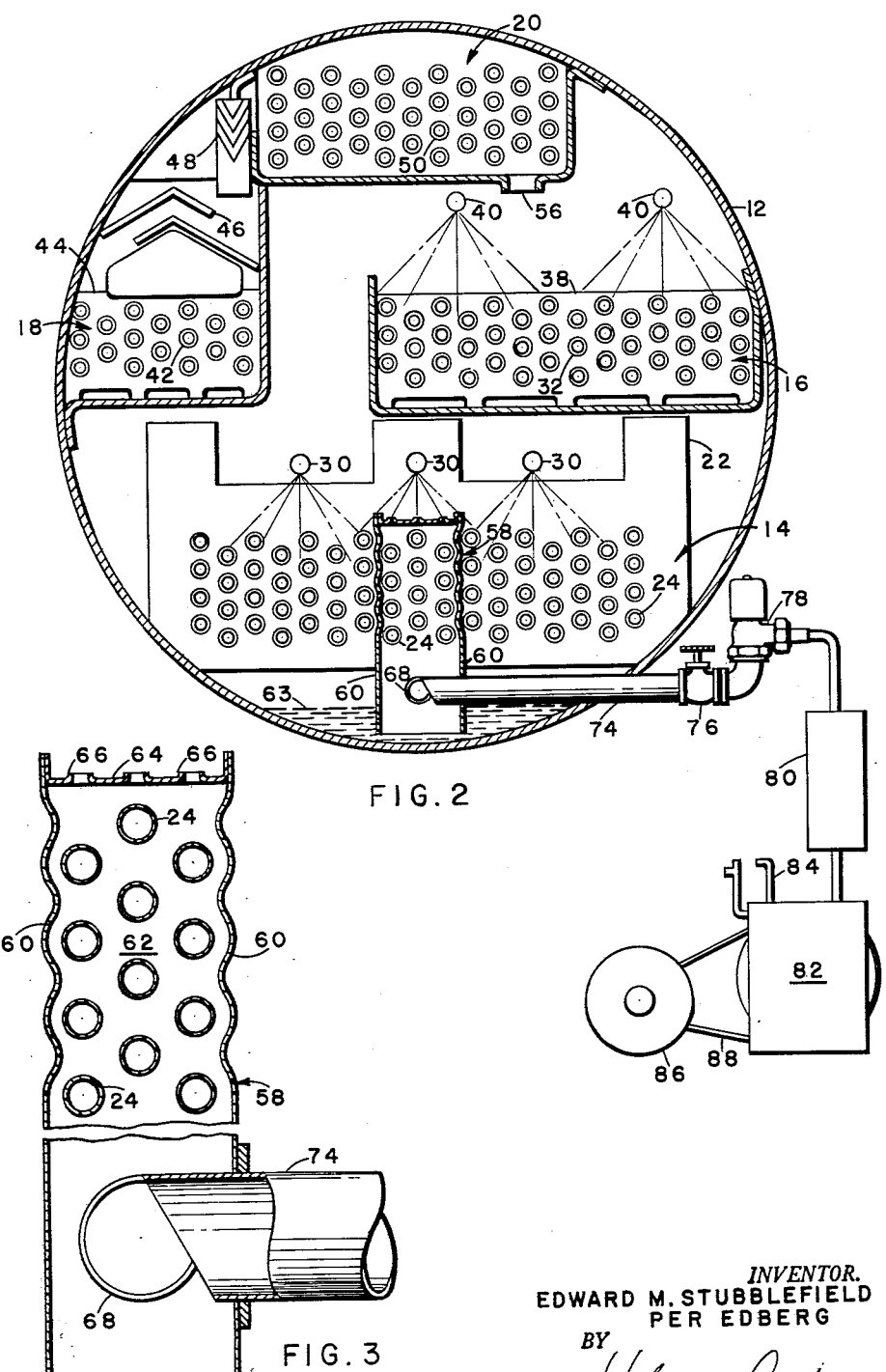
FIGURE 2 is a cross-sectional view of the machine taken on line 2—2 of FIGURE 1 and showing the evacuating mechanism diagrammatically.
FIGURE 3 is an enlarged cross-sectional view of the auxiliary absorber as seen in FIGURE 2.

Referring to FIGURE 1, the invention is embodied in an absorption refrigerating machine similar to that shown and described in U.S. patent application of Edward M. Stubblefield and Per Edberg, Serial No. 743,798, filed June 23, 1958, now Patent 2,986,906 dated June 6, 1961.

A machine of this type operates at low pressure and has a horizontally extending drum or shell 12 which encloses a longitudinally extending absorber 14 in its lower portion. A longitudinally extending evaporator 16 is mounted in the shell 12 above the absorber 14. Also mounted in the shell 12 above the absorber 14 is a generator 18. A longitudinally extending condenser 20 is located in the shell at the top. The absorber 14 has a plurality of tube supports 22 which support tubes 24. Tubes 24 communicate with an inlet header 26 and an outlet header 28. Cooling fluid flows through the absorber 14 via inlet header 26 and tubes 24 and outlet header 28. Spray pipes 30 distribute the absorption liquid over the tubes 24 whereby heat is transferred from absorption liquid to the cooling water flowing in the tubes 24. Absorption liquid is supplied under pressure to the spray pipes 30 by a pump (not shown).

Various combinations of refrigerant and absorbent may be used in the present machine. A solution of lithium bromide and water has been found to be highly satisfactory for use. Other salt solutions may be used if desired. For instance, the solution may be lithium chloride and water or sodium hydroxide and water. When it is necessary to produce low temperatures, other absorbent and refrigerant combinations may be used. When lithium chloride and water are used, the system will be under a vacuum with the generator and condenser at a higher absolute pressure than the evaporator and absorber.

The evaporator has tubes 32 connected to receive fluid to be cooled from header 34. The cooled fluid leaves the machine through header 36. Tubes 32 are supported in tube sheets 38. The refrigerant in the evaporator is recirculated through pipes 40 from which it is sprayed over the tubes 32.

The generator 18 has tubes 42 through which a heating fluid is circulated. Tubes 42 are supported by tube sheets 44. Eliminators 46 and 48 prevent drops of solution from flowing from the generator 18 to the condenser 20.

The condenser 20 has tubes 50 which receive cooling fluid from header 52. The cooling fluid leaves the condenser through header 54. The condenser 20 has an opening 56 through which condensed refrigerant flows to the evaporator 14.

The evaporator 16, generator 18, and the condenser 20 are constructed and arranged substantially as shown in the above referred to co-pending patent application and the details of construction are not shown because such details are not part of this invention.

The solutions and the refrigerant are circulated in the manner, and by means similar to that shown in the above identified co-pending patent application and the details are not a part of this invention.

An auxiliary absorber 58 is mounted in the absorber 14. Auxiliary absorber 58 has longitudinal sides 60 which are corrugated to fit between the tubes 24 of the absorber 14. To the sides 60 are secured ends 62 through which the tubes 24 extend. The open bottom of the auxiliary absorber is spaced from the bottom of the shell 12 but extends below the level 63 of solution in the absorber in order to provide a liquid seal between the auxiliary absorber and the main absorber and yet permit the flow of solution from the auxiliary absorber 58 to the main absorber 14.

The auxiliary absorber 58 is preferably secured at one end to a tube support sheet 22. The top 64 of the auxiliary absorber 58 has a plurality of upwardly flanged holes 66. The sides 60 extend above the top 64 and above the flanged holes 66 to provide a trough in which the absorption solution may collect and flow through the holes 66 into the auxiliary absorber chamber. Collecting tubes 68 extend from the interior of the auxiliary absorber 58 at each end thereof. The ends 70 of the collecting tubes 68 terminate on a bias to prevent the sprayed solution from entering. The collecting tubes 68 have inlet nozzles 72 also cut on a bias to prevent solution spray from entering. A mixture of non-condensable gases and water vapor enters the collecting tubes 68 through the nozzles 72 and the open ends 70. This mixture flows through tubes 68 to the auxiliary absorber 58.

The non-condensable gases are withdrawn from the machine through a conduit 74 which extends from the interior of the auxiliary absorber 68 to a valve 76. The conduit 74 terminates on a bias to prevent dripping solution from entering. The non-condensable gases flow from the valve 76 to a normally closed solenoid check valve 78. The non-condensable gases flow from the valve 78 to an oil separating chamber 80 and thence to a vacuum pump 82 which discharges the gases to the atmosphere through tube 84. A motor 86 drives the vacuum pump 82 through a belt 88. When the motor 86 is not energized the valve 78 is held in closed position by the differences of pressure and the weight of the solenoid plunger. When the motor 86 is energized, the solenoid 90 is also energized to remove the weight of the plunger and to compress a light spring which urges the valve toward open position. The valve 78 then opens when the pressure upstream of the valve has decreased to about one inch of water pressure greater than that downstream, but it closes to check the flow when there is a tendency for the flow to reverse its direction. The valve 78 therefore provides protection against flow of air into the unit.

While a single embodiment of the present invention has been illustrated and described, it should be understood that modifications may be made in the construction and arrangement of elements and therefore we desire to be limited only by the claims.

We claim:

1. In an absorption refrigeration system comprising a plurality of elements interconnected to provide a closed circuit for the circulation of a refrigerant and absorption liquid, an absorber, a shell enclosing said absorber, an auxiliary absorber mounted in and enclosed by said shell, means for supplying absorption liquid to said auxiliary absorber, the absorption liquid in said auxiliary absorber absorbing refrigerant vapor, means providing a liquid seal between said absorber and said auxiliary absorber to maintain a lower pressure in said auxiliary absorber than in said absorber to cause gases from said absorber to flow to said auxiliary absorber, means for supplying a cooling medium to said auxiliary absorber, and means for withdrawing non-condensable gases from said auxiliary absorber.

2. In an absorption refrigeration system comprising a plurality of elements interconnected to provide a closed circuit for the circulation of a refrigerant and absorption liquid, an absorber, a shell enclosing said absorber, conduit in said absorber for conducting a cooling fluid in heat transfer relationship with absorption liquid in said absorber, an auxiliary absorber mounted in and enclosed by said shell and substantially enclosing a space containing a portion of said conduit in said absorber, means for supplying absorption liquid to said auxiliary absorber, means for conducting a mixture of refrigerant vapor and non-condensable gases from said absorber to said auxiliary absorber, and means for withdrawing non-condensable gases from said auxiliary absorber.

3. In an absorption refrigeration system comprising a plurality of elements interconnected to provide a closed circuit for the circulation of a refrigerant and absorption liquid, an absorber, a shell enclosing said absorber, an auxiliary absorber mounted in and enclosed by said shell, means for supplying absorption liquid from said absorber to said auxiliary absorber, the absorption liquid in said auxiliary absorber absorbing refrigerant vapor and creating a lower pressure in said auxiliary absorber than in the absorber to cause gases from said absorber to flow to said auxiliary absorber, means for supplying a cooling medium to said auxiliary absorber, and means for withdrawing non-condensable gases from said auxiliary absorber.

4. In an absorption refrigeration system comprising a plurality of elements interconnected to provide a closed circuit for the circulation of a refrigerant and absorption liquid, an absorber, a shell enclosing said absorber, conduit in said absorber for conducting a cooling fluid in heat transfer relationship with absorption liquid in said absorber, an auxiliary absorber mounted in and enclosed by said shell, said auxiliary absorber substantially enclosing a space containing a portion of said conduit in said absorber, means in said absorber for spraying absorption liquid into said auxiliary absorber, means for conducting a mixture of refrigerant vapor and non-condensable gases from said absorber to said auxiliary absorber, and means for withdrawing non-condensable gases from said auxiliary absorber.

5. In an absorption refrigeration system comprising a plurality of elements interconnected to provide a closed circuit for the circulation of a refrigerant and absorption liquid, an elongated absorber, a shell enclosing said elongated absorber, conduit extending longitudinally through said elongated absorber for conducting a cooling fluid in heat transfer relationship with absorption liquid in said absorber, an auxiliary absorber mounted in and enclosed by said shell and substantially enclosing at least some of said conduit in said absorber for only a portion of their lengths, means in said absorber for supplying absorption liquid to said auxiliary absorber, means for conducting a mixture of refrigerant vapor and non-condensable gases from said absorber to said auxiliary absorber, and means for withdrawing non-condensable gases from said auxiliary absorber.

6. In an absorption refrigeration system comprising a plurality of elements interconnected to provide a closed circuit for the circulation of a refrigerant and absorption liquid, an elongated absorber, a shell enclosing said absorber, conduit extending longitudinally through said absorber for conducting a cooling fluid in heat transfer relationship with absorption liquid, an auxiliary absorber mounted in and enclosed by said shell and substantially enclosing at least some of said conduit for only a portion of their lengths, means in said absorber for spraying absorption liquid into said auxiliary absorber, means for conducting a mixture of refrigerant vapor and non-condensable gases from said absorber to said auxiliary absorber, and means for withdrawing non-condensable gases from said auxiliary absorber.

7. In an absorption refrigeration system comprising a generator, a condenser, an evaporator and an absorber interconnected to provide a closed circuit for circulation of a refrigerant and absorption liquid, a shell enclosing said absorber, conduit in said absorber for conducting a cooling fluid in heat transfer relationship with absorption liquid in said absorber, an auxiliary absorber mounted in and enclosed by said shell and substantially enclosing a space in said absorber partially occupied by a portion of said conduit, means in said absorber above said auxiliary absorber for spraying absorption liquid in said absorber, means on said auxiliary absorber for collecting a portion of the absorption liquid from said spray means and for conducting absorption liquid to the interior of said auxiliary absorber, means for conducting a mixture of refrigerant vapor and non-condensable gases from said absorber to said auxiliary absorber and means for withdrawing non-condensable gases from said auxiliary absorber.

8. In an absorption refrigeration system comprising a generator, a condenser, an evaporator, and an elongated absorber interconnected to provide a closed circuit for circulation of refrigerant and absorption liquid, a shell enclosing said elongated absorber, conduit extending longitudinally through said absorber for conducting a cooling fluid in heat transfer relationship with absorption liquid in said absorber, an auxiliary absorber mounted in and enclosed by said shell and substantially enclosing at least some of said conduit for only a portion of their lengths, means in said absorber above said auxiliary absorber for spraying absorption liquid in said absorber, means on said auxiliary absorber for collecting a portion of the absorption liquid from said spray means and for conducting absorption liquid to the interior of said auxiliary absorber, means for conducting a mixture of refrigerant vapor and non-condensable gases from said absorber to said auxiliary absorber and means for withdrawing non-condensable gases from said auxiliary absorber.

9. In an absorption refrigeration system comprising a plurality of elements including a generator, a condenser, an evaporator and an absorber interconnected to provide a closed circuit for circulation of a refrigerant and absorption liquid, a shell enclosing said absorber, conduit means in said absorber for conducting a cooling fluid in heat transfer relationship with absorption liquid in said absorber, an auxiliary absorber mounted in and enclosed by said shell and substantially enclosing a space in said absorber partially occupied by a portion of said conduit means, means in said absorber above said auxiliary absorber for spraying absorption liquid in said absorber, means for supplying absorption liquid to said auxiliary absorber, said auxiliary absorber having an opening below the level of absorption liquid in said absorber to provide a vapor seal and to provide a passageway for the flow of absorption liquid from said auxiliary absorber to said absorber, means for conducting a mixture of refrigerant vapor and non-condensable gases from said absorber to said auxiliary absorber and means for withdrawing non-condensable gases from auxiliary absorber.

References Cited in the file of this patent

UNITED STATES PATENTS

Re. 23,093     Roswell _____ Mar. 22, 1949